(12) United States Patent
Ha et al.

(10) Patent No.: US 7,120,097 B1
(45) Date of Patent: Oct. 10, 2006

(54) SYSTEM FOR MAKING A PHOTORESIST MASTER FOR A HYBRID OPTICAL RECORDING DISC

(75) Inventors: Bruce Ha, Webster, NY (US); Thomas C. Burgo, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 896 days.

(21) Appl. No.: 09/662,561

(22) Filed: Sep. 15, 2000

(51) Int. Cl.
*G11B 5/09* (2006.01)

(52) U.S. Cl. ................................. 369/47.48; 369/59.23

(58) Field of Classification Search ............. 369/59.23, 369/59.27, 59.1, 47.48; G11B 5/09, 5/76; H04N 5/76
See application file for complete search history.

(56) References Cited

U.S. PATENT DOCUMENTS

| | | | |
|---|---|---|---|
| 5,297,129 A | | 3/1994 | Wilkinson et al. |
| 5,608,711 A | * | 3/1997 | Browne et al. ............. 369/116 |
| 5,696,758 A | * | 12/1997 | Yanagimachi et al. ... 369/275.4 |
| 5,737,289 A | | 4/1998 | Udagawa |
| 5,809,006 A | | 9/1998 | Davis et al. |
| 5,862,123 A | | 1/1999 | Horie et al. |
| 5,940,364 A | * | 8/1999 | Ogata et al. ............. 369/275.4 |
| 6,043,764 A | * | 3/2000 | Sannino et al. ................ 341/59 |
| 6,310,854 B1 | * | 10/2001 | Sato et al. ............... 369/275.3 |
| 6,377,518 B1 | * | 4/2002 | Auwens et al. .......... 369/30.04 |
| 6,487,164 B1 | * | 11/2002 | Endoh et al. ............ 369/275.4 |
| 6,570,840 B1 | * | 5/2003 | Wilkinson et al. ....... 369/275.4 |

FOREIGN PATENT DOCUMENTS

| | | |
|---|---|---|
| EP | 0311372 | 4/1989 |
| EP | 0762392 | 3/1997 |
| EP | 1001409 | 5/2000 |
| JP | 07-296426 | 3/1996 |

* cited by examiner

*Primary Examiner*—A M Psitos
(74) *Attorney, Agent, or Firm*—Raymond L. Owens

(57) ABSTRACT

A laser beam recording system for exposing a photoresist master disc having a photoresist layer formed over a substrate for making a hybrid optical recording disc having a read only (ROM) portion and a writable portion, including a first optical modulator for modulating an intensity of a first laser beam having a wavelength selected to provide activating radiation to expose a pattern in the photoresist layer formed over the substrate of the master disc between a lower intensity for exposing a groove in the photoresist layer and a higher intensity for exposing the groove and a pattern of depressions in the groove in the photoresist layer; and a second optical modulator for frequency-modulating an intensity-modulated second laser beam with a wobble-frequency to cause the exposed groove to be a continuously frequency-modulated groove. The recording system also includes a laser beam modulation control system for controlling the operation of the first and second optical modulators to form a continuously frequency-modulated exposed groove with exposed depressions in the ROM portion of the exposed groove. The first and the second laser beams can be provided by one laser as a single laser beam, by one laser as two split laser beams, and by a first and a second laser.

10 Claims, 13 Drawing Sheets

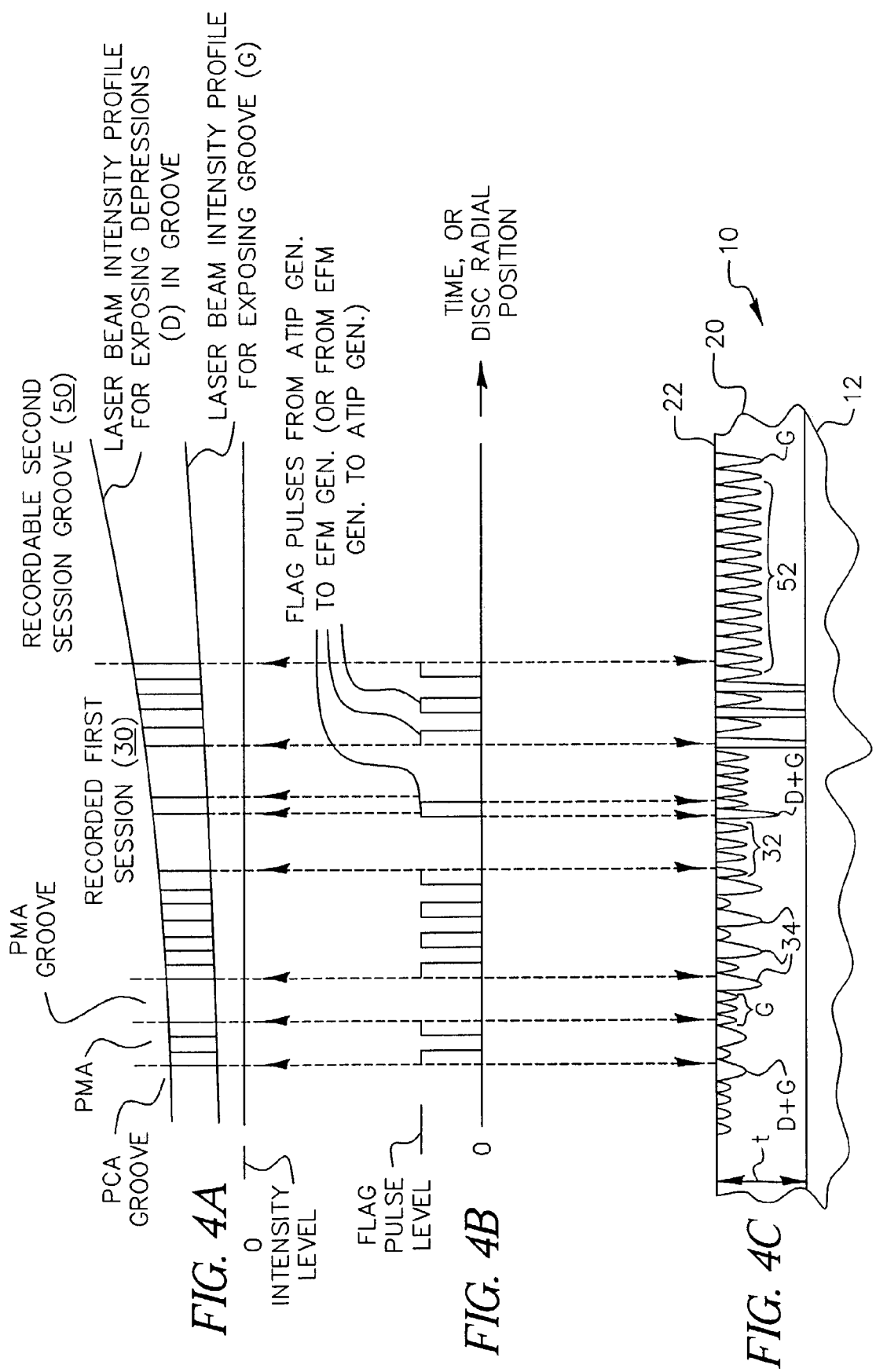

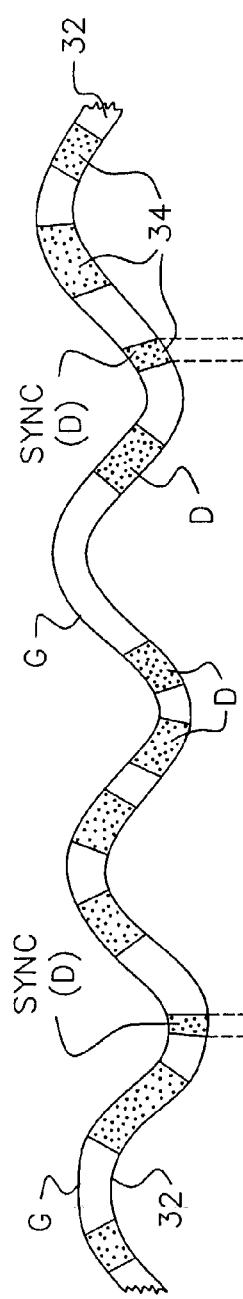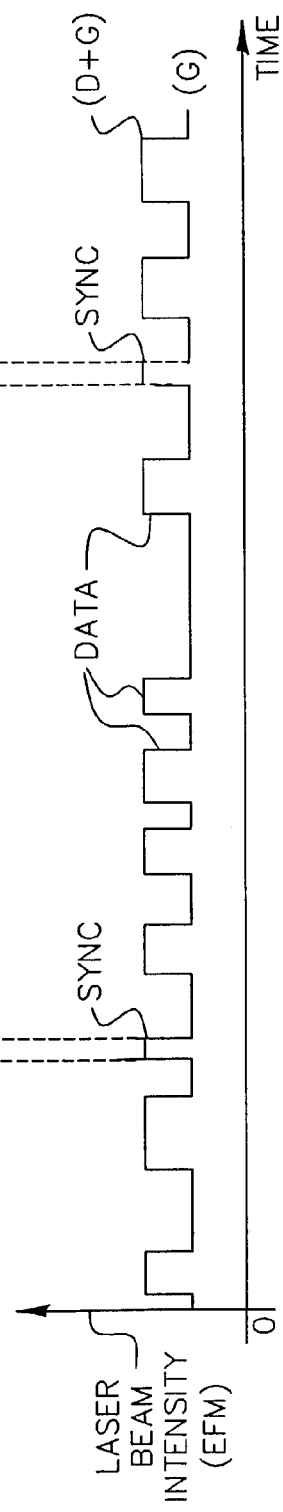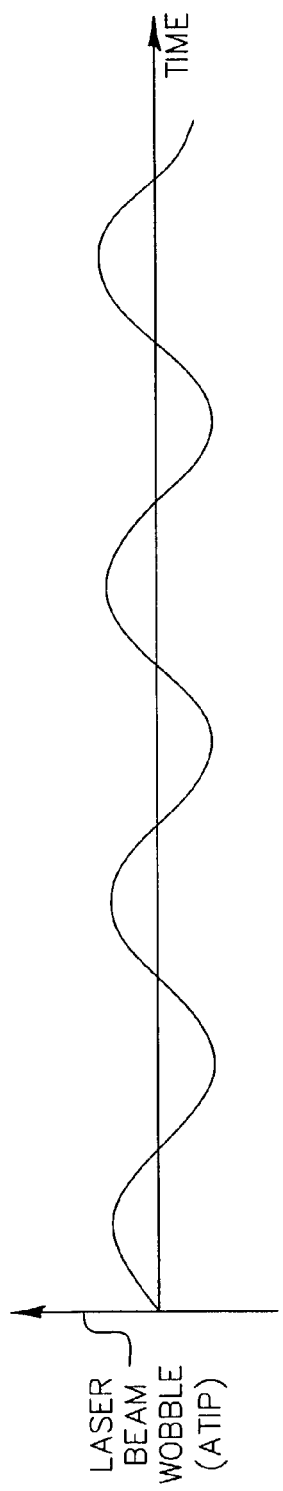

FIG. 7B

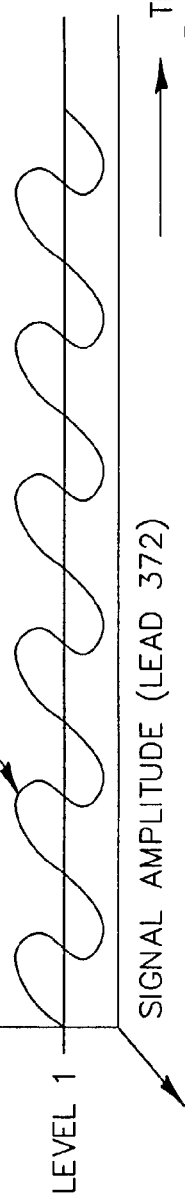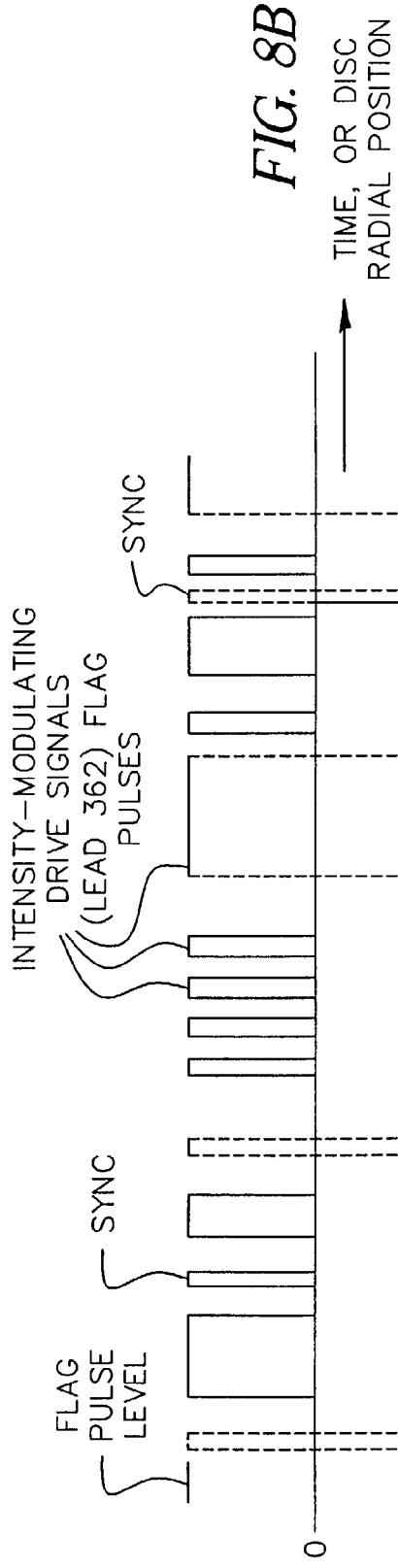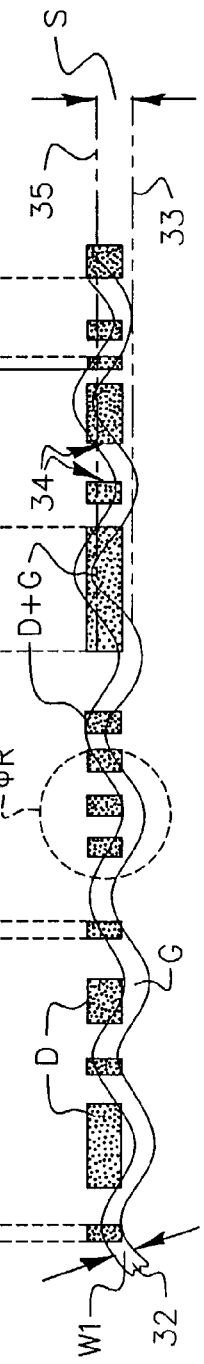

SYSTEM FOR MAKING A PHOTORESIST MASTER FOR A HYBRID OPTICAL RECORDING DISC

FIELD OF THE INVENTION

The present invention relates to optical recording discs and more particularly to a system for making a photoresist master disc from which a stamper can be made for forming a hybrid optical recording disc.

BACKGROUND OF THE INVENTION

Hybrid optical recording discs are discs having a read-only memory (ROM) area and a recordable area for recording or writing data which are usually generated by a computer user and which are recorded on the disc by a recorder or writer controlled by a computer. Such a disc has a substrate which can be formed by injection molding against a master plate so that the mastered substrate will have a continuous spiral track extending from an inner edge to an outer edge of the substrate. The spiral tack is usually a groove which provides data channels on the disc and also provides for tracking of the disc while reading or recording data. The groove is frequency-modulated in a direction normal to the groove and is, therefore, referred to as a wobbled groove or a wobble groove. In the ROM area of a hybrid optical disc the groove is further modulated in the form of depressions which correspond to disc addressing data and to disc program data. The mastered substrate is then coated with a recording layer which can include an organic dye selected to absorb radiation in the recordable area. Upon coating the recording layer, a reflective layer is formed over the entire recording layer. A protective layer, usually of a polymer organic material, is formed over the reflective layer.

The tracks or grooves of a hybrid optical recording disc, the degree of modulation of the groove, as well as the arrangement of addressing and program data is usually provided in accordance with Orange Book specifications. "Orange Book" is a specification published by Philips Corporation and Sony Corporation which defines key properties of recordable compact disc media and recording performance.

The aforementioned master plate is used to produce numerous plastic disc substrates by embossing or injection molding techniques. Such a master plate is also referred to as a stamper. The stamper, in turn, is produced by metal plating techniques whereby a photoresist master having the spiral groove and the data depressions is plated with a metal. The metal layer is then separated from the photoresist master and constitutes the stamper which replicates the features of the photoresist master in an inverted orientation, i.e. a groove in the photoresist master will be a projection in the stamper. The photoresist master disc comprises a photoresist layer formed over a substrate which is usually a glass substrate. Accordingly, the photoresist master is also referred to in the art as a glass master.

Depending on the configuration and on the intended application of an optical disc, particular challenges and problems need to be addressed to meet and to retain specifications in accordance with standards such as, for example, defined in the aforementioned Orange Book or in a Red Book, also published by =Philips Corporation and Sony Corporation. For example, Horie et al., U.S. Pat. No. 5,862,123 disclose optical phase-change material formed on a substrate which has a wobbled spiral groove on a substrate. Particular relationships are selected between a groove width, a laser beam diameter, and a wobble amplitude to prevent distortion of the groove caused by repeated over-writing operations. In FIG. 10 of U.S. Pat. No. 5,862,123 to Horie et al., a block diagram of a laser beam recording apparatus is shown for recording grooves and data on a photoresist layer formed over a glass substrate, i.e. for recording a "glass master" having the selected particular relationships.

Udagawa, U.S. Pat. No. 5,737,289 discloses a data recording apparatus providing different plural recording laser powers within respective subcode frames constituting sub-partitions of an optical disc so as to determine an optimum laser drive power. Also disclosed are laser drive circuit and control circuitry.

Wilkinson et al., U.S. Pat. No. 5,297,129 disclose a method and apparatus for shaping the waveform of laser pulses to achieve improved characteristics (leading and trailing edges) of surface effects recorded on an optical disc. An optical modulator is used to modulate the intensity of a laser beam either above or below a threshold level to either produce surface effects on a moving recording medium, or to be incapable of producing surface effects on the moving recording medium when the laser beam intensity is below a threshold level.

The fabrication of a photoresist master disc dedicated to forming a hybrid optical recording disc poses significant technological challenges which differ from the challenges encountered by the above cited references. Firstly, conventional laser beam recording systems for recording a photoresist master dedicated for a conventional CD-ROM do not have the ability to record a photoresist master in a multi-session format required of a hybrid optical recording disc. Nor do such conventional CD-ROM laser beam recording systems provide a capability to record frequency-modulated or wobbled grooves. For example, in a hybrid optical disc, the ROM area includes a first session which includes a ROM lead-in area, a ROM program area, and a ROM lead-out area. The recordable area of the hybrid optical disc constitutes a second session comprising a lead-in area, a recordable program area, and a lead-out area. Since the hybrid optical recording disc has a recordable area, the photoresist master for such a disc must be recorded so as to simulate a CD writer and thus write the first session and leaving it open for appending, i.e. for subsequent writing in the recordable area of the hybrid optical disc, the writing to be performed by a computer user. It is also required to record in such a photoresist master various codes and addressing data which allow a writer to recognize the hybrid optical disc as being writable.

Furthermore, a photoresist master for a hybrid optical disc must meet particular specifications within a transition area between the lead-out area of a recorded first session and a lead-in area of the recordable second session.

In particular, the transition between the ROM area and the recordable area has a specification of a 26EFM frame interval. An EFM generator is used to modulate the intensity of a laser beam so as to record a continuous spiral groove and data in portions of the groove in the form of depressions. A frame has a typical duration of about 130 microseconds. Conventional laser beam recording systems designed for recording photoresist masters for conventional CD-ROMs rely on decoding a subcode in the EFM data stream to change or to modulate the recording laser beam via a coded channel such as a RS232 channel. However, the response of a typical RS232 channel is in a range of milliseconds, a response time which is too long for meeting the 26EFM frame interval requirement accurately and consistently.

Thus, existing conventional laser beam recording systems for recording photoresist masters of conventional CD-ROMs have to be modified in order to have a performance which meets the requirements of recording a photoresist master for a multi-session hybrid optical recording disc.

SUMMARY OF THE INVENTION

It is an object of the present invention to provide a laser beam recording system for making a photoresist master for a hybrid optical recording disc.

This and other objects and advantages are achieved in a radiation beam recording system for exposing a photoresist master disc having a photoresist layer formed over a substrate for making a hybrid optical recording disc having a read only (ROM) portion and a writable portion, comprising:

a) at least one radiation source which provides first and second radiation beams projected along first and second beam paths, respectively, each beam having a wavelength or energy selected to provide activating radiation for exposing a pattern in the photoresist layer formed over the substrate of the master disc;

b) a first modulator for modulating an intensity of the first radiation beam and disposed along the first beam path, such intensity modulation having an intensity for exposing depressions in the photoresist layer in correspondence with data to be recorded;

c) a second modulator for frequency-modulating the second radiation beam and disposed along the second beam path, such frequency modulation providing a wobble-frequency to cause an exposed groove in the photoresist layer to be a continuous wobbled groove;

d) means for combining the modulated first and second radiation beams and for projecting the combined radiation beams onto the photoresist layer for exposing the photoresist layer to form the exposed continuous wobbled groove and a track of exposed depressions along the wobbled groove; and e) a modulation control system for controlling the operation of the first and the second modulator to concurrently form the exposed continuous wobbled groove and the track of exposed depressions along the wobbled groove in the ROM portion.

In another aspect of the present invention logic flag signals are provided between and among an ATIP generator and an EFM generator to achieve microsecond response times in modulating the intensity of a laser beam. The logic flag signals are used between the ATIP generator and the EFM generator, or vice versa, to modulate the intensity of a laser beam to achieve desirable geometric features of the recorded groove and the depressions in a transition region between a ROM area and a recordable area of a hybrid disc. The term ATIP refers to "absolute time in pregroove". The term EFM refers to "eight-to-fourteen modulation".

BRIEF DESCRIPTION OF THE DRAWINGS

FIGS. 4A–4C show schematically relationships between flag pulses, a laser beam intensity profile for exposing a groove (G) and for exposing depressions (D) in a groove in a ROM area of the master disc, and an exposure profile in a photoresist layer of a master disc;

FIGS. 5A–5F depict schematically several signals associated with particular devices of the laser beam modulation control system of FIG. 3C and an exposure prefile in a photoresist layer of a master disc exposed by a laser beam controlled by such signals;

FIGS. 6A–6C show schematically a segment of a frequency-modulated wobble groove (G) containing the depressions (D), a laser beam intensity profile, and a laser beam wobble signal, respectively;

FIG. 7B is a schematic block diagram of a dual-beam laser recording system in accordance with the present invention in which first and second laser beams are provided by separate lasers for generating an intensity-modulated laser beam and a frequency-modulated laser beam for recording on a photoresist master disc;

FIGS. 8A–8C show schematically relationships between a frequency-modulating drive signal biased at a first intensity level and intensity-modulating flag pulses to expose a wobbled groove and a track of depressions extending along the wobbled groove in the photoresist layer of the master disc;

It will be appreciated that the drawings are necessarily of a schematic nature since the temporal relationships of pulses and signals are controlled within a range of a fraction of a microsecond. Additionally, the depth dimensions of the photoresist layer and the depressions exposed therein, as well as the lateral dimensions of the wobbled groove and of the depressions in the ROM area of the groove, are too small to permit appropriate or proportionate scaling.

DETAILED DESCRIPTION OF THE INVENTION

Figure 1:
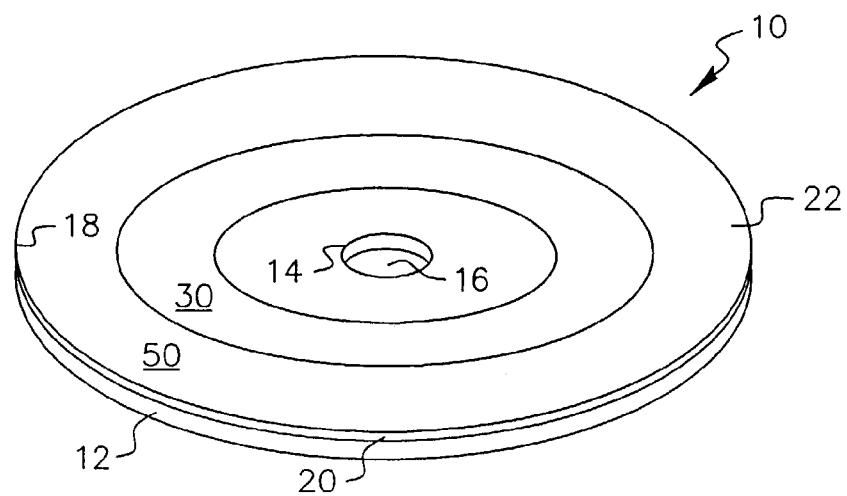
FIG. 1 is a simplified schematic perspective view of a photoresist master disc having a ROM area and a recordable area.
Figure 2:
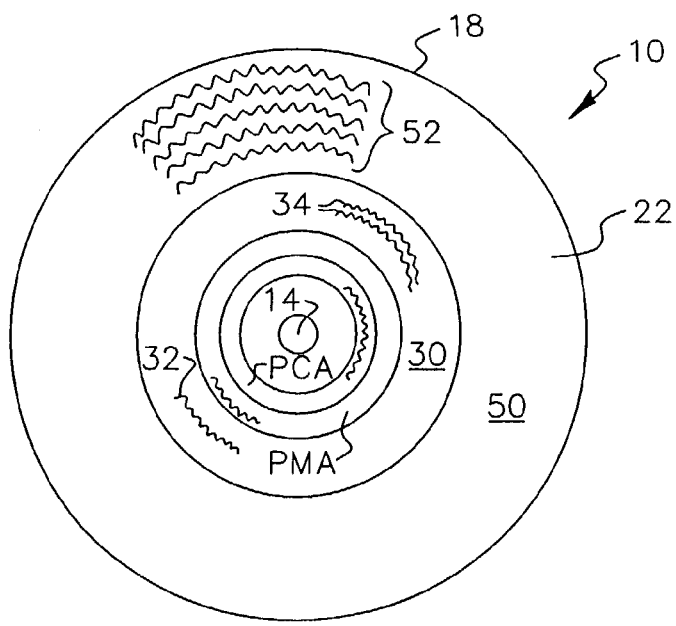
FIG. 2 is a schematic plan view of the photoresist master disc of FIG. 1, indicating frequency-modulated segments of a groove and intensity-modulated and frequency-modulated segments of a groove as well as a power calibration area (PCA) and a program memory area (PMA)

Referring to FIG. 1 and FIG. 2, a photoresist master disc 10 is shown in accordance with the present invention. The photoresist master disc 10 has a substrate 12 in which an inner peripheral edge 14 forms a central hole 16, and the disc 10 having an outer peripheral edge 18. The central hole 16 permits the photoresist master disc 10 to be mounted in a disc transport device of a laser beam recording system. The photoresist master disc 10 includes a read-only memory (ROM) area 30 and a recordable area 50. Overlying the substrate 12 is a photoresist layer 20 which is responsive to activating radiation of a laser beam in a laser beam recording system such that a laser beam incident on a surface 22 of the photoresist layer 20 will form a pattern of a spiral groove, and of depressions in the groove which correspond to recorded data in the ROM portion of the photoresist layer 20.

The substrate 12 is usually formed of glass, but it can also be formed of quartz or of a ceramic material. The photoresist layer 20 is preferably formed by spin-coating of a positive-working photoresist material which is "activated" by exposure to activating radiation having a wavelength in a range from 350–450 nm. The term "activated" relates to a photochemical reaction upon exposure.

In accordance with the specification of the "Orange Book", both the ROM area 30 and the recordable area 50 are partitioned. For example, the ROM area 30 is partitioned into a lead-in area, a program area, and a lead-out area. The recordable area likewise is partitioned to include a lead-in area, a program area, and at least one lead-out area. For purposes of clarity of presentation, such lead-in, program, and lead-out areas have been omitted from the drawing of FIG. 2.

Near the inner peripheral edge 14, a power calibration area (PCA) and a program memory area (PMA) are shown.

Segments of a frequency-modulated groove 32 and 52 are schematically indicated in thin wavy outline. Segments of an intensity-modulated and frequency-modulated groove 34 are schematically depicted in the ROM area 30 in wavy outline interspersed with bold dots and dashes to indicate formation of depressions along such groove segments.

Figure 3A:
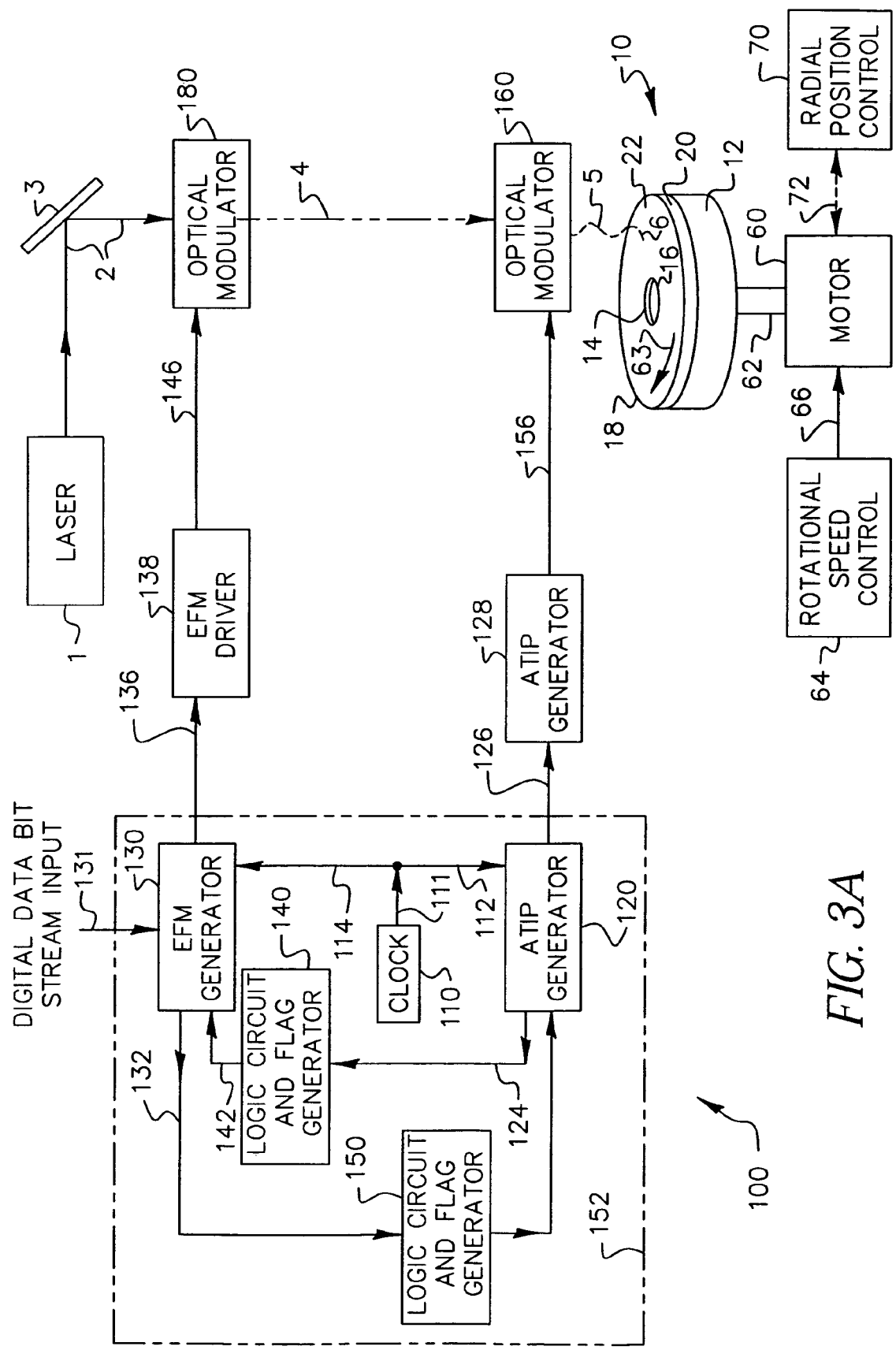
FIG. 3A is a block diagram of a first embodiment of a laser beam recording system in accordance with the present invention for recording concurrently a frequency-modulated and intensity-modulated groove on a photoresist master disc.

Turning to FIG. 3A, there is shown a block diagram of a first embodiment of a laser beam recording system for making a photoresist master disc from which a stamper can be fabricated for forming a hybrid optical recording disc. A laser 1 emits a laser beam 2 of activating radiation to which a photoresist layer 20 of a photoresist master disc 10 is responsive. The laser beam 2 is directed by a mirror 3 to a first optical modulator 180 which is dedicated to modulate the intensity of the laser beam 2 in response to signals provided by an EFM driver 138 via a lead 146. The intensity-modulated laser beam 4, depicted in bold, dashed, and dotted outline, is directed to a second optical modulator 160 dedicated to provide a frequency modulation to the intensity-modulated laser beam 4 in response to signals provided by an ATIP driver 128 via a lead 156. The frequency-modulated and intensity-modulated laser beam 5 is schematically indicated in a wavy outline with bold dots and dashes, and the laser beam 5 is focused by optical elements (not shown) to be incident on a surface 22 of a photoresist layer 20 at a point 6.

The photoresist master disc 10 is rotated by a motor 60 via a disc-drive spindle 62 in a direction 63 of disc rotation during the recording process. The motor is operated under a motor rotational speed control 64, and the radial position of incidence of the laser beam 5 on the photoresist master disc 10 is determined by a radial position control 70 via a radial position linkage 72, so as to expose in the photoresist layer 20 a continuous spiral groove extending from the inner peripheral edge 14 to the outer peripheral edge 18 of the photoresist master disc 10, whereby the spiral groove is frequency-modulated (i.e., wobbled) and is intensity-modulated to form depressions in the spiral groove in correspondence with recorded data.

A laser beam modulation control system 100 has a central clock 110 which provides clock pulses via a leads 111 and 112 to an ATIP generator 120, and to an EFM generator 130 via a lead 114. "ATIP" is a commonly used abbreviation for "actual time in pregroove" and "EFM" is a commonly used abbreviation for "Eight-to-Fourteen Modulation". The ATIP generator and the EFM generator are also referred to as ATIP encoder and EFM encoder, respectively. The ATIP generator 120 is operative to provide control of the laser beam recording system in that the ATIP generator provides all of the timing functions in accordance with specifications contained in the aforementioned "Orange Book" or contained in the aforementioned "Red Book." The ATIP generator 120 also provides a frequency-modulating signal via a lead 126 to the ATIP driver 128 which, in turn, drives the optical modulator 160 via the lead 156. This frequency-modulating signal, also referred to as a wobble-frequency signal, comprises a carrier frequency of 22.5 kHz which is modulated with a frequency deviation of ±1 kHz.

The EFM generator 130 has an input lead 131 for receiving input signals from an external source (not shown) in a form of a digital data bit stream. The external data source can be, for example, a CD-ROM. The EFM generator 130 generates EFM signal pulses representative of 14-bit data streams and these pulses are directed to an EFM driver 138 via a lead 136, and from the EFM driver 138 via a lead 146 to the optical modulator 180 for modulating the intensity of the laser beam in correspondence with the data stream from the EFM generator 130.

The laser beam modulation control system 100 further includes circuitry for controlling temporal relationships between and among the ATIP generator and the EFM generator so that respective ATIP signals and EFM signals are temporally correlated to provide concurrent operation of the first and second optical modulations 180 and 160. For control of temporal relationships, FIG. 3A depicts two logic circuits which link the ATIP generator 120 and the EFM generator 130. A first logic circuit 140 receives from the ATIP generator 120 via a lead 124 timing flag pulses which are sequenced in accordance with the timing function of the ATIP generator 120, and the logic circuit 140 conveys these timing flag pulses to an input of the EFM generator 130 via a lead 142. In addition, the ATIP generator 120 provides to the EFM generator 130 via the logic circuit 140 other pulsed signals, such as for example, SYNC pulse signals (synchronization pulse signals).

A second logic circuit 150 provides a logic communication link between the EFM generator 130 and the ATIP generator 120 via leads 132 and 152, respectively.

The logic signals communicated among the ATIP generator 120 and the EFM generator 130 provide so-called flag signals, or flags, which are hardware-based rather than requiring the decoding of software-based instructions.

The hardware-based logic communication among the ATIP generator 120 and the EFM generator 130 proceeds in practice as follows: the EFM generator 130 first instructs the ATIP generator 120 via the logic circuit 150 about its readiness to produce intensity-modulating EFM signals corresponding to the input signals at lead 131. Upon receiving such instruction from the EFM generator 130, the ATIP generator 120 communicates timing signals to the EFM generator via the logic circuit 140 and, since the ATIP generator controls the timing sequence, i.e. when to switch from exposing a depression in the groove to exposing only the groove, and vice versa, in the photoresist layer 20, the ATIP generator 120 controls the EFM generator 130 as to when to change the laser beam intensity via the EFM driver 138 and the optical modulator 180. The logic circuits 140 and 150 are preferably TTL (transistor-to-transistor) logic circuits.

These hardware-based logic flag signals (representing 1s and 0s) provide for microsecond response of the laser beam intensity modulation in the optical modulator 180.

Figure 3B:
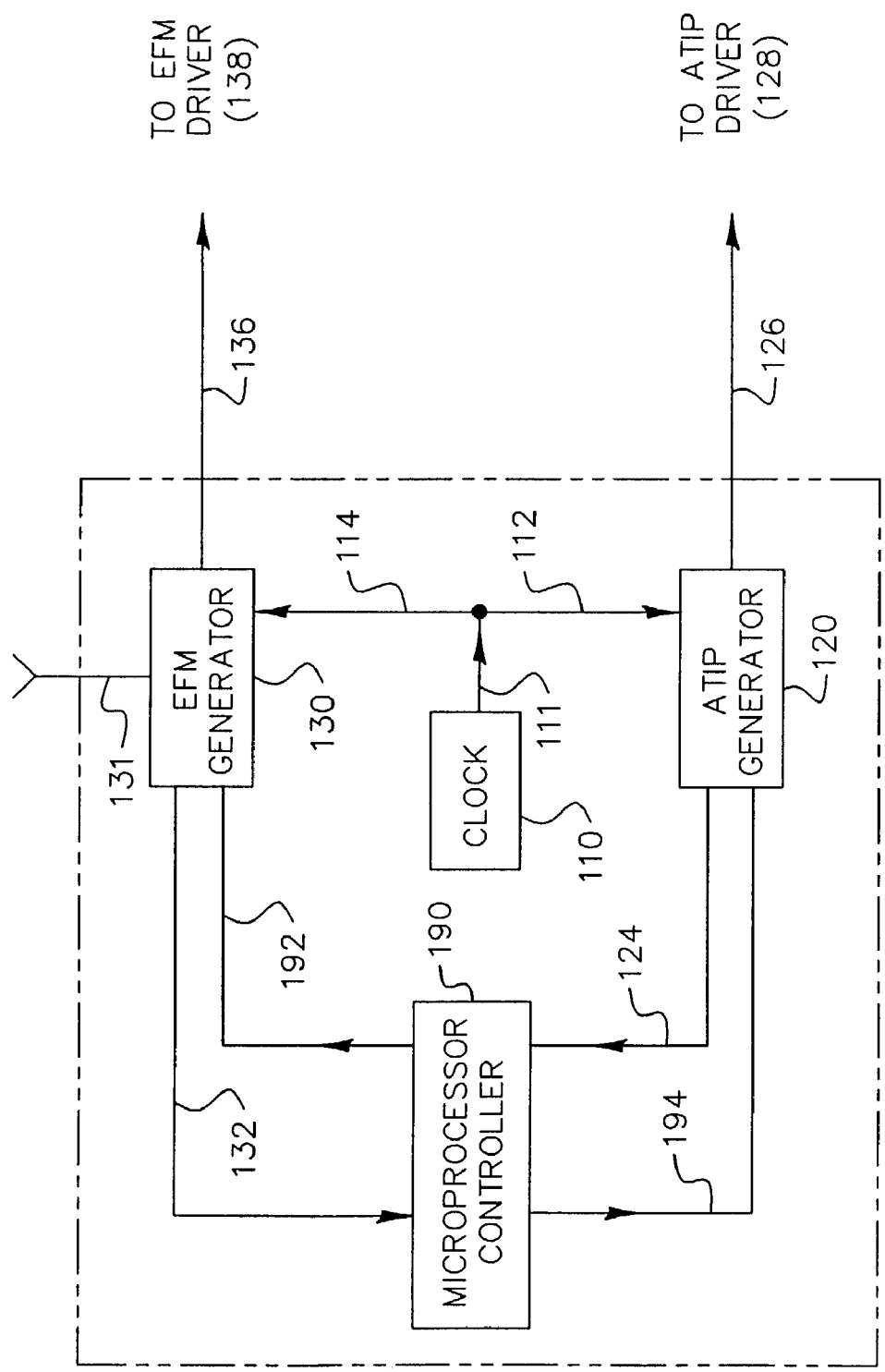
FIG. 3B shows an alternative means for controlling temporal relationships between intensity-modulating signals and frequently-modulating signals.

In FIG. 3B, a laser beam modulation control system 102 is shown in which a microprocessor controller 190 performs the control of temporal relationships between and among signals from the ATIP generator 120 and the EFM generator 130 in a manner as described above. Corresponding leads are 124 and 192, and 132 and 194.

Figure 3C:
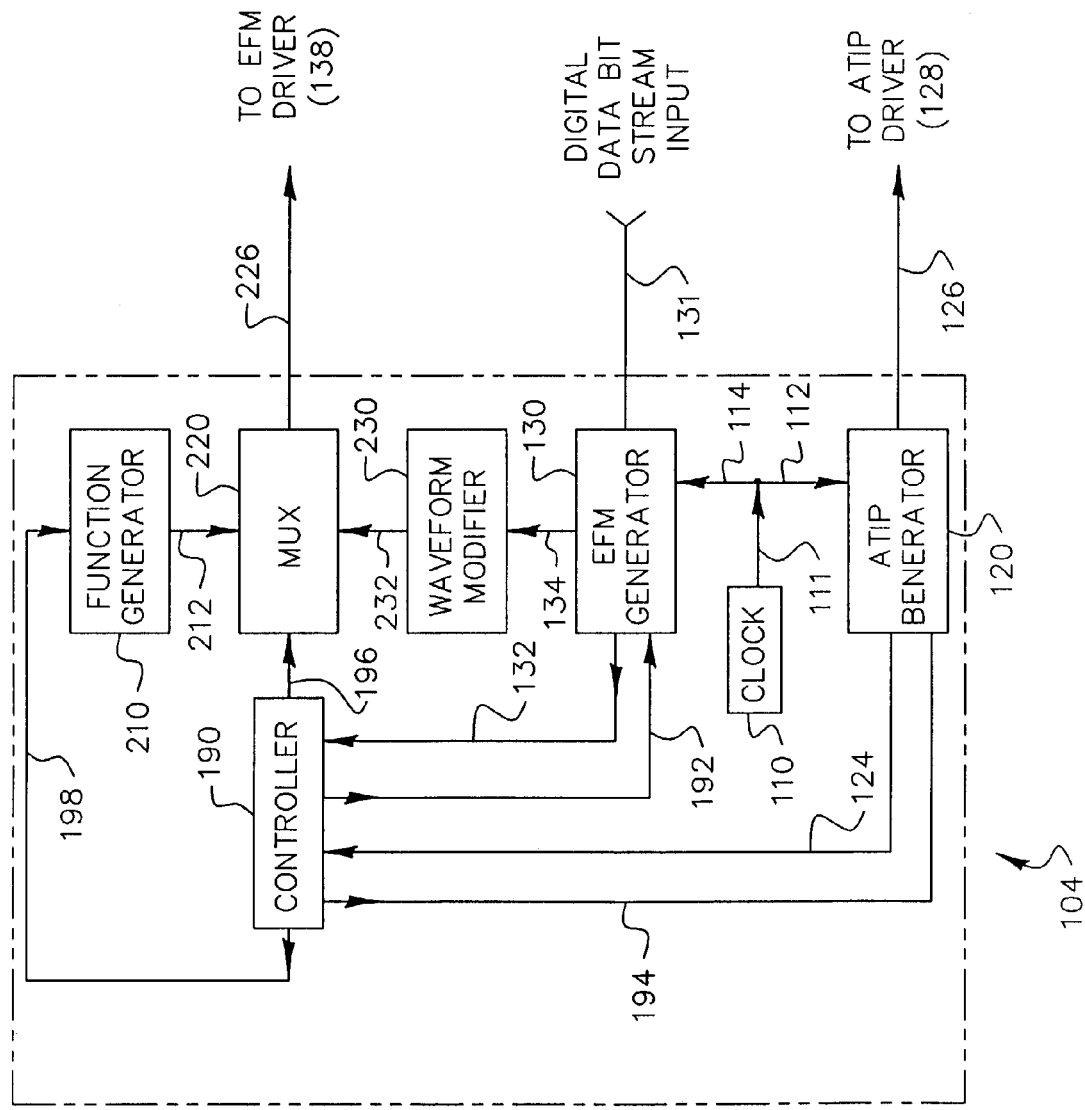
FIG. 3C shows an alternative means for controlling temporal relationships between intensity-modulating signals and frequency-modulating signals, and including a waveform modifier, a function generator, and a multiplexer.

FIG. 3C is a block diagram of a laser beam modulation control system 104 which includes a waveform modifier, a function generator, and a multiplexer.

The laser beam modulation control system 104 has a central clock 110 which provides clock pulses via a leads 111 and 112 to an ATIP generator 120, and to an EFM generator 130 via a lead 114.

The ATIP generator 120 provides a frequency-modulating signal via a lead 126 to the ATIP driver 128 which in turn, drives the optical modulator 160 via the lead 156 (see FIG. 3A).

The EFM generator 130 has an input lead 131 for receiving input signals from an external source (not shown) in a form of a digital data bit stream. The external data source can be, for example, a CD-ROM. The EFM generator 130 generates EFM signal pulses representative of 14-bit data streams. An output of the EFM generator provides the EFM signal pulses to an input of a waveform modifier 230 via a lead 134. The waveform modifier 230 can introduce a selectable bias voltage level so that the EFM signal pulses are superimposed upon a selected bias voltage. The bias voltage is selected at a level sufficient to expose (in the absence of superimposed EFM signal pulses) a groove in the photoresist layer 20, for example, a groove 52 shown in the recordable area 50 of FIG. 2. Additionally, the waveform modifier can be used to modify the shape of the EFM signal pulses provided by the EFM generator 130, if such pulse shape modification is advantageous. For purposes of clarity of presentation, the ensuing description, viewed in conjunction with the description of FIGS. 4A–4F, will be limited to the bias voltage aspect of the waveform modifier 230.

An output of the waveform modifier 230 is connected to one signal input of a multiplexer 220 via a lead 232. The multiplexer is commonly abbreviated to the term "MUX". The MUX has a second signal input connected to an output of a function generator 210 via a lead 212. The function generator provides a temporally varying signal, for example, a ramp function signal, which is used advantageously in modulating the laser beam intensity so as to expose a groove pattern of varying depth in the photoresist layer 20, as will be described in greater detail hereinafter.

The output of the mulitplexer 220 is connected to the input of the EMF driver 138 via a lead 226. The EMF driver 138, in turn, drives the optical modulator 180 via a lead 146 to modulate the intensity of the laser beam 2 (see FIG. 3A), thus providing the intensity-modulated laser beam 4 in correspondence with the output signals of the MUX.

The laser beam modulation control system 104 further includes a controller 190 for controlling temporal relationships between and among signals from the ATIP generator 120 and the EFM generator 130 so that respective ATIP signals and EFM signals are temporally correlated to provide concurrent operation of the first and second optical modulations 180 and 160. The controller 190 is preferably a microprocessor which provides a control signal to the function generator 210 via a lead 198, and provides a control signal to a control signal input of the multiplexer 220 via a lead 196, in response to flag signals (digital 1s) communicated to and from the controller 190 between the ATIP generator 120 and EFM generator 130, and vice versa. The controller 190 receives from the ATIP generator 120 via a lead 124 timing flag pulses which are sequenced in accordance with the timing function of the ATIP generator 120, and the controller 190 conveys these timing flag pulses to an input of the EFM generator 130 via a lead 192. In addition, the ATIP generator 120 provides to the EFM generator 130 via the controller 190 other pulsed signals, such as for example, SYNC pulse signals (synchronization pulse signals).

The controller 190 provides a second logic communication link between the EFM generator 130 and the ATIP generator 120 via leads 132 and 194, respectively.

The logic signals communicated among the ATIP generator 120 and the EFM generator 130 via the controller 190 provide so-called flag signals, or flags, which are hardware-based rather than requiring the decoding of software-based instructions.

The hardware-based logic communication among the ATIP generator 120 and the EFM generator occurs in a manner as described above with reference to FIGS. 3A and 3B.

Figure 10:
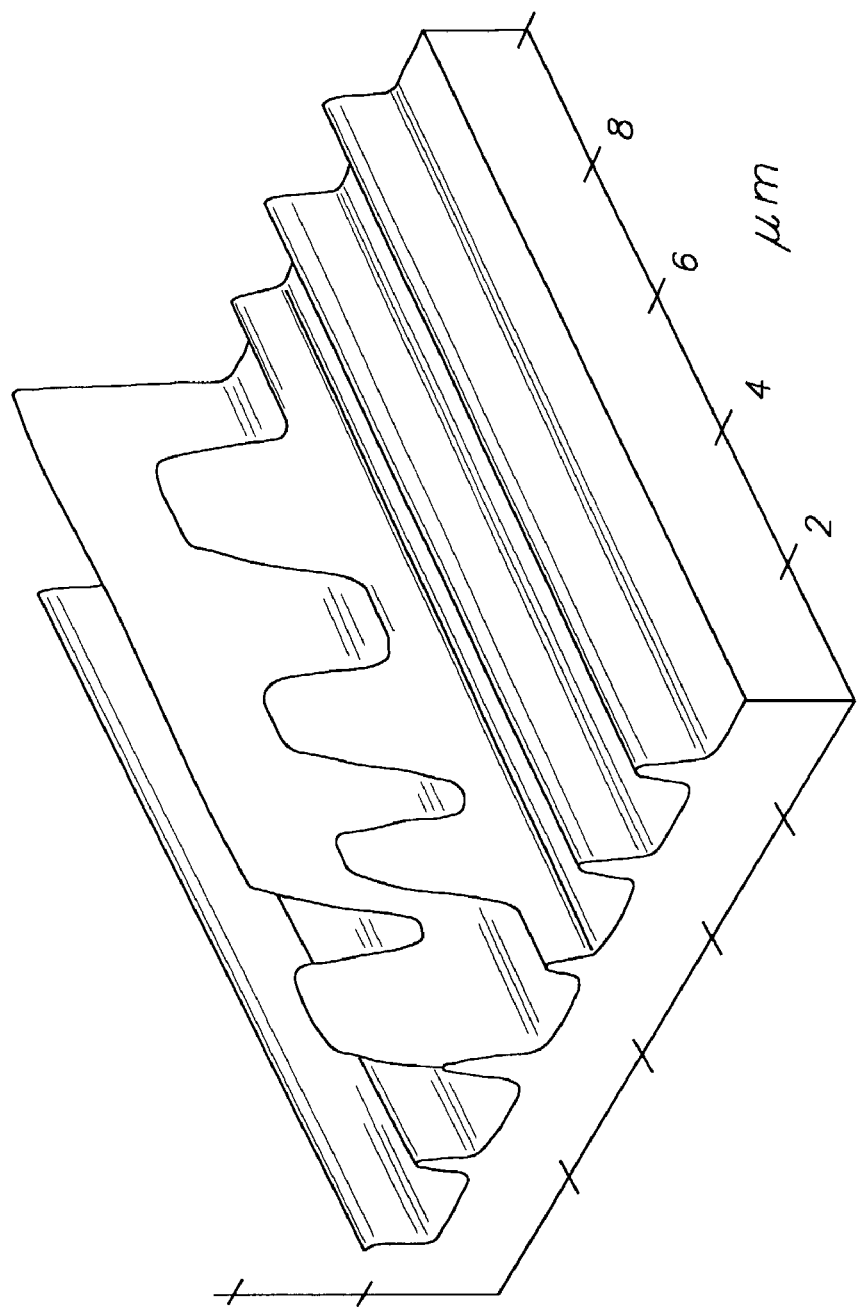
FIG. 10 is a representation of a photographic rendition of a portion of the surface of a stamper made from a photoresist master and showing transitions from segments of a groove, to depressions along a groove, to groove segments in a PMA area of the photoresist master disc.

Upon completion of the laser beam exposure of the photoresist layer, the photoresist layer is developed in a conventional manner, thereby producing the wobbled groove such as the wobbled groove segments 32 and 52 depicted in FIG. 2, and intensity-modulated wobbled groove segments (i.e. groove segments containing depressions) such as, for example, the intensity-modulated wobbled groove segment 34 shown in FIG. 2. Subsequently, a metal stamper is formed by plating against the patterned photoresist layer 20, and such stamper is then used to make hybrid optical recording disc substrates from a plastic material by embossing techniques or by injection molding techniques. In FIG. 10, a photographic rendition of a portion of such a metal stamper is shown.

Turning now to FIGS. 4A–4C, relationships are schematically indicated between laser beam intensity profiles for exposing a groove (G) and depressions (D) in the groove, respectively (FIG. 4A), and flag pulses representative of a digital data stream from the EFM generator 130 (FIG. 4B). FIG. 4C schematically indicates a portion of the photoresist master disc 10 showing laser beam generated exposure profiles in the photoresist layer 20 in correspondence with the intensity-modulated laser beam profile shown in FIG. 4A. A thickness t of the photoresist layer 20 is indicated. The photoresist layer thickness is in a preferred range of about 290–350 nm.

Turning to a description of FIGS. 5A–5F, there are depicted schematically several signals associated with particular devices of the laser beam modulation control system 104 shown in FIG. 3C. All signals are drawn along a time axis which is also equivalent to a radial position at which the intensity-modulated and wobble-frequency-modulated laser beam 5 is incident at point 6 on the surface 22 of the photoresist layer 20 of the master disc 10 (see FIG. 3A). It will be appreciated that the signals represent only a few microseconds of recording time for exposing a groove (G) and depressions (D) in the groove (D+G).

FIG. 5A shows a sequence of flag pulses as generated by the EFM generator 130 at lead 134 in correspondence with the digital data bit stream input at lead 131, and in accordance with the previously described logic communication between and among the ATIP generator 120 and the EFM generator 130 via the controller 190. These pulses, as well as all other signals shown in FIGS. 5B–5E, are depicted as positive-going signals, but it will be understood that some or all signals can be negative-going signals as may be required by operational characteristics of a particular device or of particular devices.

The EFM generator output signal on lead 134 are flag pulses which rise from, and fall to, a zero voltage or signal level. The pulse height may be in a range from 3V to 24V typical of digital signaling systems.

In FIG. 5B, the above described EFM generator output signal has been modified by the waveform modifier 230 such that EFM generator output signal pulses are now superimposed on a bias level (a bias voltage). This waveform modifier output signal is directed to one input of the MUX 220 via lead 232 (see FIG. 3C). As previously described, the bias voltage is selected so that the optical modulator 180 will modulate the laser beam 2 to produce a lower intensity laser beam 4 sufficient to expose a groove pattern to a selected depth into the photoresist layer 20 as measured from the surface 22 of the layer. The bias voltage may be selected in a range from about 0.1 to 24 volts.

FIG. 5C shows schematically a ramp function signal generated by the function generator 210 in response to an input signal from the controller 190 via lead 198. The function generator output signal is directed to a second input of the MUX 220 via a lead 212. The function generator output signal is shown here as a ramp function which increases linearly with time from an initial level above a zero level to a maximum ramp signal $V_R$. For illustrative purposes only, the ramp signal is shown to decrease from $V_R$ to zero at a time slightly longer than a time of a last EFM generator output signal pulse, as indicated by dotted reference lines. It will be understood that the function generator 210 is capable of generating other output signals, such as, for example, a signal increasing non-linearly with time, or a signal which first increases over a first time period, followed by a decrease over a subsequent second time period. It will also be appreciated that the controller 190, which controls the starting time and the termination time of the output signal of the function generator 210, can direct the function generator to provide an output signal for a substantially shorter time period than depicted in FIG. 5C.

An important aspect of the function generator 210 is to provide an output signal to the second input of the MUX 220 of a signal level selected to determine, for example, in a power calibration area (PCA) of the photoresist master disc (see FIG. 2), a level of intensity modulation of the laser beam via the optical modulator 180 which is sufficient to expose a discernible and developable groove in the photoresist layer 20 for the various regions shown in FIG. 4A.

FIG. 5D depicts a MUX control signal provided by the controller 190 to a control signal input of the multiplexer 220 via a lead 196.

The MUX 220 is an electronic switch which directs either the waveform modifier output signal (see FIG. 5B) or the function generator output signal (see FIG. 5C) to the EFM driver 138 via the lead 226 in response to the MUX control signal.

As shown schematically in FIG. 5E, a MUX output signal on lead 226 is a composite signal of the waveform modifier output signal whenever the MUX control signal is in an "on-state", and of the function generator output signal whenever the MUX control signal is in an "off-state", i.e. at a zero level. The optical modulator 180 will provide an intensity-modulated laser beam 4 in correspondence with the MUX output signal via the EFM driver 138.

Figure 5F:
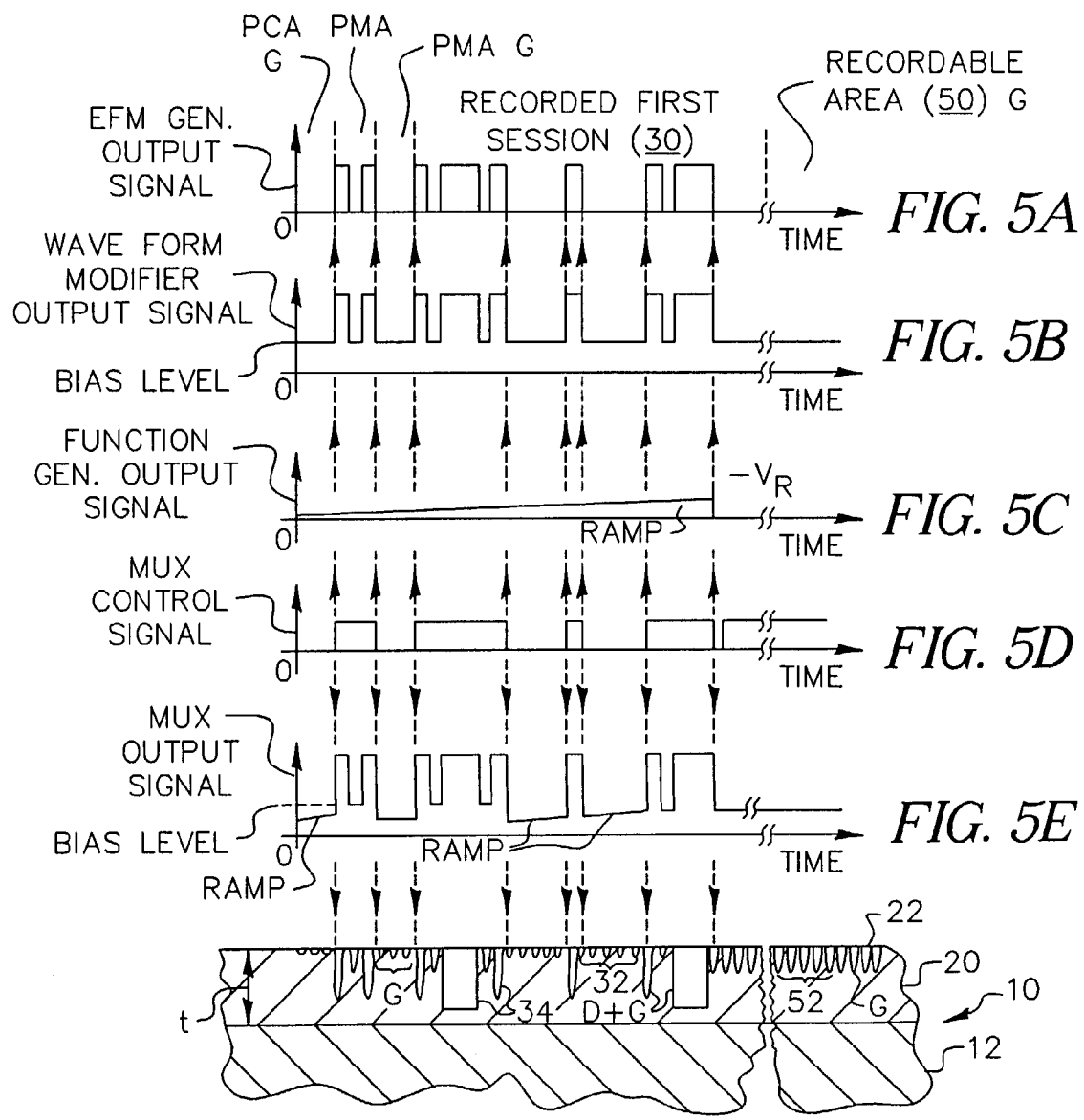

FIG. 5F schematically indicates exposed depressions D in segments of the exposed spiral groove G, in correspondence with a laser beam exposure which was intensity-modulated by the composite MUX output signal of FIG. 5E. In the recorded first session 30, the data track(s) 34 in the spiral groove segments 32 are exposed at a higher intensity in correspondence with the higher pulsed portions of the MUX output signal. In the recordable area or portion 50 of the spiral wobbled groove 52 has a constant depth exposure as measured from the upper surface 22 of the photoresist layer 20.

Referring now to FIG. 6A, there is depicted schematically a segment of a wobbled groove 32 (see FIG. 2) exposed in the photoresist layer 20. The wobbled groove is also intensity-modulated in the form of exposed depressions (D) which correspond to recorded data, and depressions corresponding to SYNC signals. Regions of the groove 32 which are devoid of exposed depressions are indicated at G. Together, the exposed depressions (D) can be visualized as a track of depressions 34 in the exposed wobbled groove 32.

FIG. 6B depicts schematically laser beam intensity-modulating pulses provided to the EFM driver 138 by the modulation control systems 100, 102 or 104 (see FIGS. 3A–3C). The function generator output signal (see FIGS. 5C, 5E) has been omitted from this drawing. As described above, the ATIP generator 120 provides via the clock 110 SYNC pulses through the controller 190 to the EFM generator 130 which, in turn, results in the exposure of SYNC depressions in the groove 34 via the optical modulator 180.

FIG. 6C schematically indicates the wobble-frequency signal provided by the ATIP generator 120 to the optical modulator 160 via the ATIP driver 128. The peak-to-peak wobble of a wobbled groove is typically a range of about 30 nm.

Figure 7A:
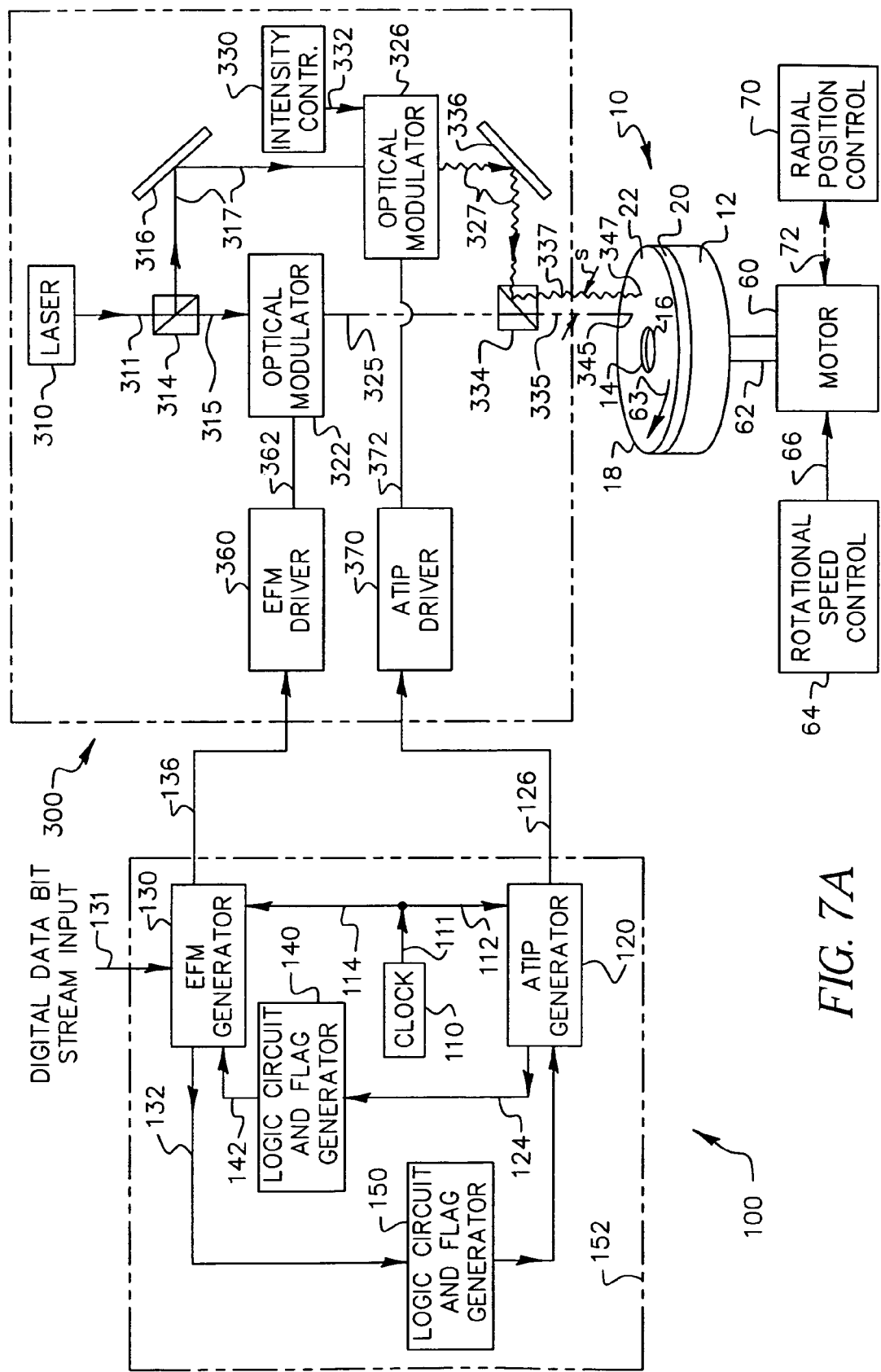
FIG. 7A is a schematic block diagram of a dual-beam laser recording system in accordance with the present invention in which a laser beam is split into first and second beams for providing an intensity-modulated laser beam and a frequency-modulated laser beam for recording on a photoresist master disc.

FIG. 7A is a schematic block diagram of a dual-beam laser recording system 300 suitable for exposing a wobbled groove, and depressions in the groove in the ROM area, in a photoresist layer 20 of a master disc 10. The laser beam modulation control system 100, previously described with reference to FIG. 3A is shown here for illustrative purposes. It will be understood that the laser beam modulation control systems 102 or 104 described with reference to FIGS. 3B and 3C, respectively, can be used to control the recording system 300.

A laser 310 emits a laser beam 311 of activating radiation to which the photoresist layer 20 is responsive. A beam splitter 314 splits the laser beam 311 into two laser beams 315, 317. The first laser beam 315 is intensity-modulated by an optical modulator 322 which is activated or driven by an EFM driver 360 via a lead 362. The optical modulator 322, the EFM driver 360, and the lead 362 correspond to the modulator 180, the driver 138, and the lead 146, respectively, of the laser beam recording system of FIG. 3A. The optical modulator 322 produces an intensity-modulated laser beam 325 depicted in dashed and dotted outline.

The second laser beam 317 is directed by a mirror 316 to an optical modulator 326 which provides a frequency-modulated laser beam 327, indicated in wavy outline. An intensity controller 330 provides an intensity-controlling bias signal to the modulator 326 via a lead 332 for selecting a laser beam intensity level of the wobble-frequency-modulated ("wobbled") laser beam 327, as will be described in greater detail with reference to FIGS. 8A–8C and 9A, 9B.

The laser beam 327 is directed via a mirror 336 to a beam combiner 334 which recombines the first intensity-modulated laser beam 325 and the second wobble-frequency-modulated laser beam 327. If perfect optical alignment can be achieved, the beam combiner 334 would provide two spatially superimposed laser beams 335 (intensity-modulated) and 335 (frequency-modulated) which would expose the photoresist layer 20 at a single point of incidence thereon. However, in order to more clearly illustrate the distinguishing recording aspects of the dual-beam laser recording system 300 compared with the recording aspects of the system of FIG. 3A (a single-beam laser recording system), the laser beams 335 and 337 are depicted with a small lateral spacing s therebetween which extends to the points of incidence 345 and 347, respectively, of these laser beams on the photoresist layer 20.

Figure 9A:
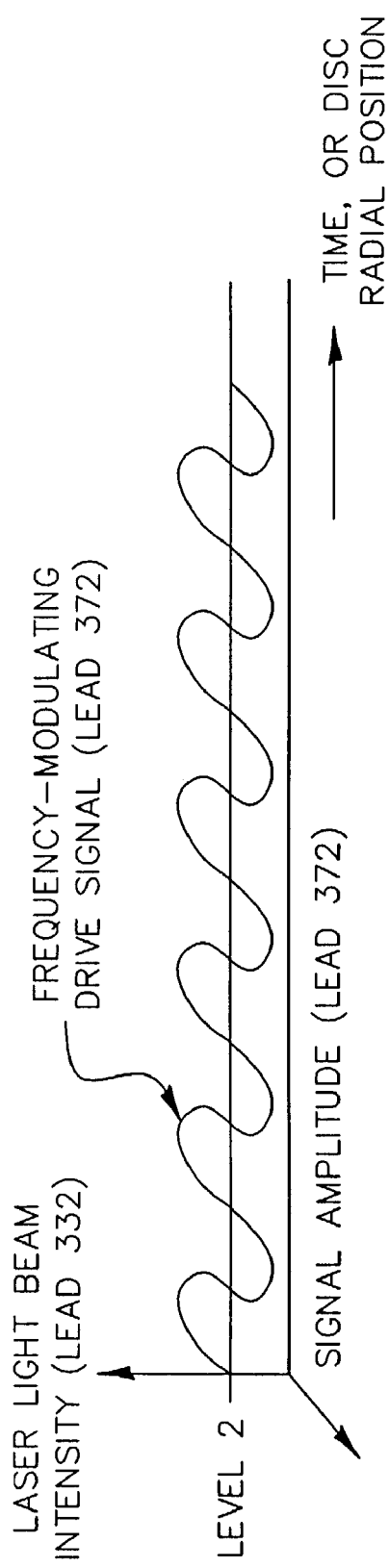
FIGS. 9A–9B show schematically a relationship between a frequency-modulating drive signal biased at a higher second intensity level to expose a wider wobbled groove and the track of depressions of FIG. 8C.
Figure 9B:
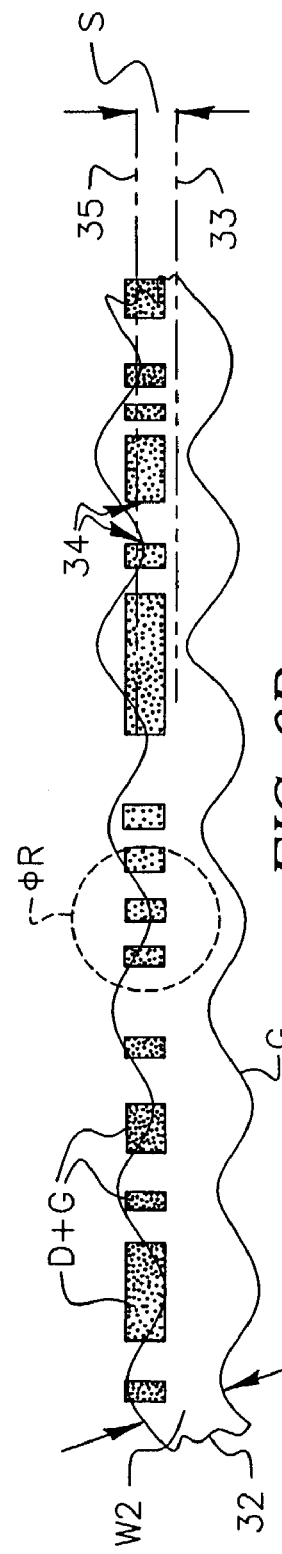

If the spacing s is a radial spacing, i.e. a spacing which produces an exposed wobbled groove in the photoresist layer 20 and a track of exposed depressions spaced from a centerline of the exposed groove, the radial spacing s has to be confined within certain limits as will be further detailed with respect to FIGS. 8C and 9B.

If the spacing s between the points of incidence 245 and 247 of the laser beams 335 and 337, respectively, occurs along one and the same radial position of the rotating and radially translating photoresist master disc 10, such spacing can be confined to a lesser extent.

The photoresist master disc 10, the speed control 64, and the radial position control 70 have been described with reference to FIG. 3A and require, therefore, no additional description.

Figure 7B:
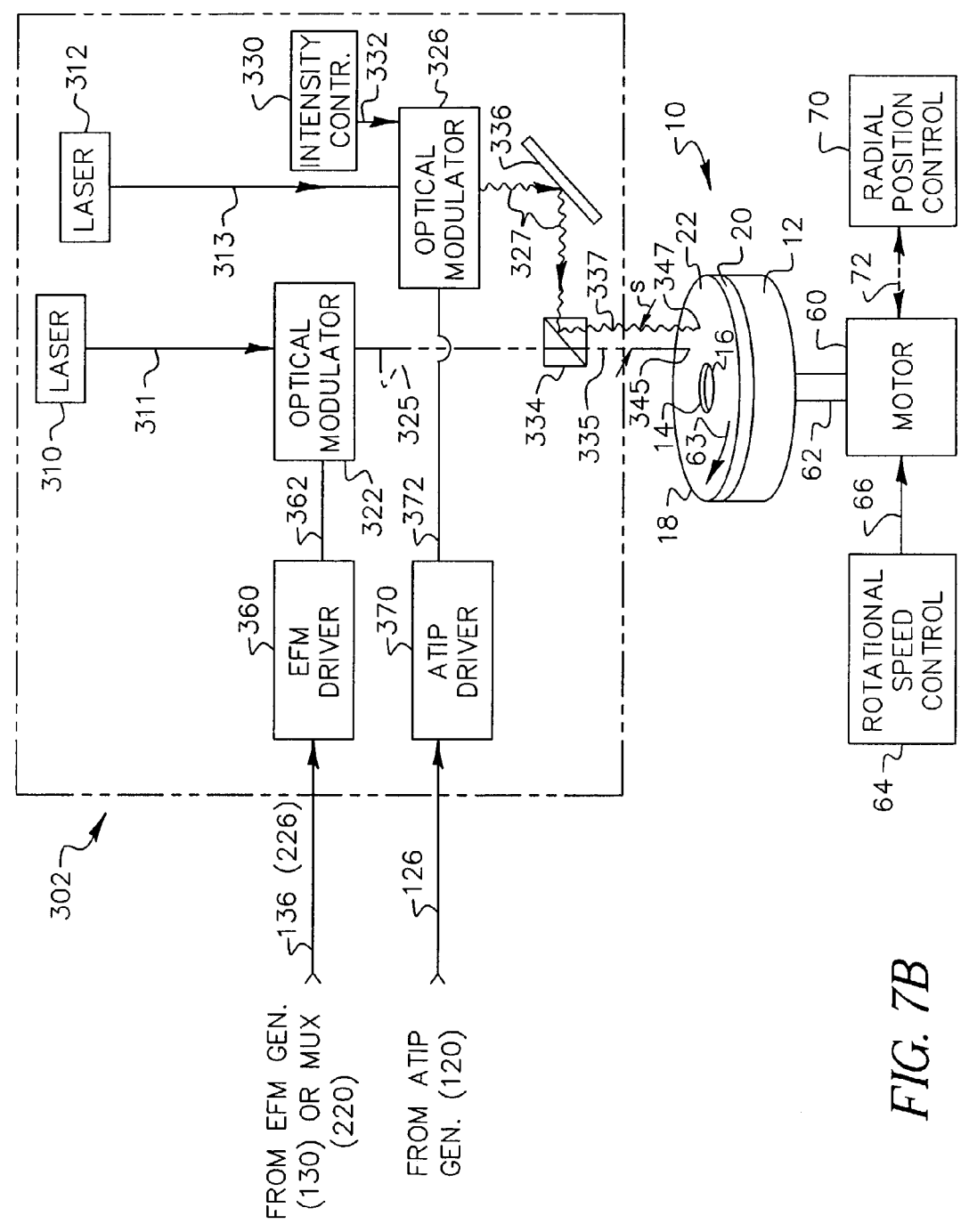

FIG. 7B is a schematic block diagram of another embodiment of a dual-beam laser recording system 302 which differs from the above described dual-beam system 300 in that two separate lasers 310 and 312 are used to provide corresponding first and second laser beams 311 and 313, respectively. The first laser beam 311 is intensity-modulated by the modulator 322, and the second laser beam 313 received a wobble-frequency modulation in the optical modulator 326, as described with reference to FIG. 7A. All other parts, aspects, and functions of the dual-beam laser recording system 302 correspond to like parts, aspects, and functions of the system 300 of FIG. 7A.

Figure 7C:
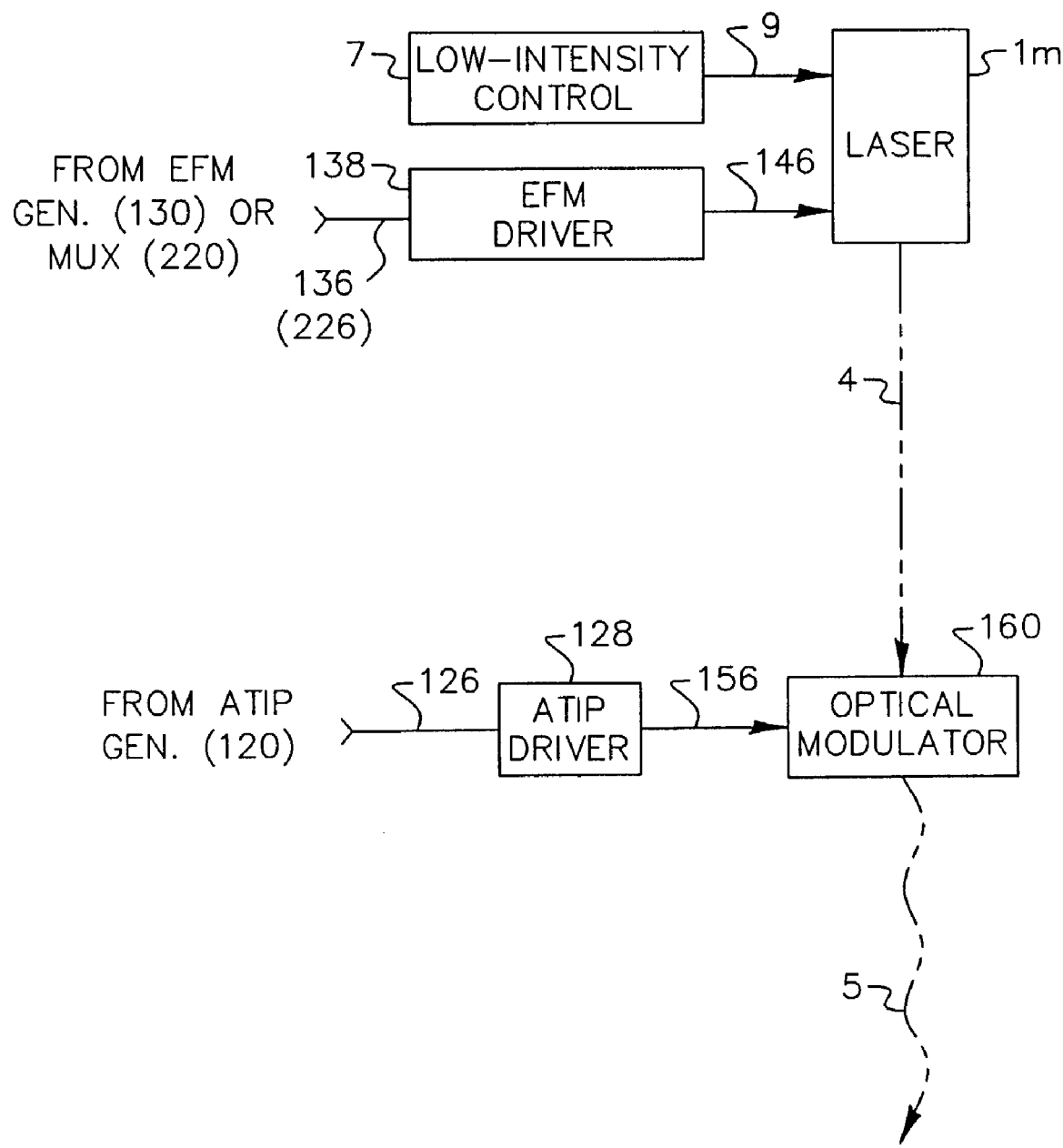
FIG. 7C is a schematic block diagram of an alternative laser beam recording system in which a single laser provides an intensity-modulated laser beam by directly intensity-modulating the laser.

FIG. 7C is a schematic block diagram of an alternative laser beam recording system in which a single modified laser 1m provides an intensity-modulated laser beam 4 (intensity-modulated between a lower intensity level and a higher intensity level) which is concurrently modulated with a wobble-frequency in an optical modulator 160 to provide an intensity- and frequency-modulated laser beam 5 for exposing a photoresist layer of a master disc (not shown in FIG. 7C; see FIG. 3A).

The laser 1m is operative via a low-intensity control 7 provided at a lead 9 to provide a lower-intensity level (also referred to as a "bias" intensity level) in the absence of flag pulses from the EFM generator 130 via lead 136 (see FIGS. 3A, 3B) or in the absence of signals from the multiplexer 220 via lead 226 (see FIG. 3C). When such flag pulses are present at the lead 136 (226), the EFM driver 138 actuates the laser 1m directly via lead 146 to provide a higher-intensity level in response to such flag pulses so that the intensity-modulated laser beam 4 emanates therefrom.

FIGS. 8A–8C and 9A–9B refer particularly to exposure of the photoresist layer 20 by one of the dual-beam laser recording systems 300 or 302 which were depicted to have the small spacing s between the two modulated laser beams 335 and 337 at their corresponding points of incidence 345 and 347, respectively, on the surface 22 of the photoresist layer 20.

Viewing FIGS. 8A–8C and 9A–9B together will more readily inform as to the distinguishing features of such exposures over exposures of a photoresist master disc provided by a single-beam laser recording system such as, for example, the system of FIG. 3A or of FIG. 7C.

FIGS. 8A and 9A show schematically a frequency-modulating drive signal having a signal amplitude as measured at lead 372, i.e. the lead which connects an output of the ATIP driver 370 to an input of the optical modulator 326 of FIGS. 7A and 7B. In FIG. 8A, the intensity control 330 provides to the optical modulator 326 a bias level signal at lead 332 which results in a steady laser light beam intensity at a level 1 (also referred to as a level 1 bias light level). In FIG. 9A, the intensity control 330 provides to the optical modulator 326 a bias level signal which results in a steady laser light beam intensity at a level 2 which is depicted, for illustrative purposes, to be higher than the level 1 intensity being transmitted as the frequency-modulated laser beam 327 by the modulator 326.

Turning now to FIG. 8, intensity-modulating drive signals (flag pulses and SYNC pulses) are shown as measured at lead 362 which connects an output of the EFM driver 360 with an input of the optical modulator 322 for exposing depressions in the photoresist layer 20 in correspondence with data (0's or 1's). It should be noted that these flag pulses do not require a low-intensity bias level, in contrast to the single-beam recording systems as described with particular reference to FIGS. 4A, 5B–5E, and 6B, since the wobbled groove G is continuously exposed in the photoresist layer 20 by the frequency-modulated second laser beam 337 in the dual-beam recording systems 300, 302. Stated differently, in these dual-beam systems, the wobbled groove G is exposed by the second laser beam 337, and a track of depressions D is exposed by the first laser beam 345 in correspondence with the digital data bit stream input to the EFM generator 130. A substantially identical sequence of flag pulses and SYNC pulses has been omitted in FIGS. 9A and 9B.

Viewing FIGS. 8C and 9B together, a center line 33 of an exposed wobbled groove 32 is radially spaced by a spacing s from a center line 35 of a track 34 of exposed depressions which are exposed in the photoresist layer 20 in accordance with the flag pulses as indicated by the dotted reference lines extending between FIGS. 8B and 8C. The exposed wobbled groove 32 of FIG. 8C has an exposed width dimension W1 which corresponds to the laser light beam intensity level 1 of the frequency-modulating drive signal (see FIG. 8A) and provided to the optical modulator 326 by the intensity control 330 via lead 332. The exposed wobbled groove 32 of FIG. 9B is depicted with an exposed width dimension W2 which corresponds to the laser light beam intensity level 2 of the frequency-modulating drive signal (see FIG. 9A).

When the spacing s between the first and second laser beams 335 and 337 is a radial spacing between the points of incidence 345 and 347 on the surface 22 of the photoresist layer 20 (see FIGS. 7A and 7B), as schematically shown in FIGS. 8C and 9B, the radial spacing must be limited so that a diameter ØR of a reading laser light beam can read a wobbled groove G and the depressions D through the substrate of a finished hybrid optical recording disc.

When the first and second laser beams 335 and 337 are in perfect optical alignment to provide substantially a single point of incidence of both laser beams on the surface of the photoresist layer (i.e. at a spacing s=0), the track 34 of exposed depressions D would remain a straight-line track which is now centered within an exposed wobbled groove G of an exposed width dimension W1 or W2. A substantially identical result is obtained if the first and second laser beams 335 and 337 have a spacing s which extends along one and the same radial position of the rotating photoresist master disc 10.

From the foregoing description it will be apparent that a dual-beam laser recording system will exposed, in a photoresist layer of a master disc, a straight-line track of depressions D (data) within or along an exposed wobbled groove G, whereas the depressions D will be exposed within, and following an outline of, an exposed wobbled groove G when using a single-beam laser recording system, as depicted in FIG. 6A.

Turning to FIG. 10, there is shown a photographic reproduction of a small portion of a metal stamper which was formed by plating a laser beam-exposed and subsequently developed photoresist master disc 10. The photograph of the stamper is taken in a PMA area (see FIG. 2) and shows transitions between segments which will form a wobbled groove, to segments which will form a wobbled groove having deep depressions, and finally to segments which will form a wobbled groove, in a molded hybrid optical disc substrate.

Although the disclosed embodiments are described with reference to optical modulators and laser beams, those skilled in the art will appreciate that other sources of radiation can be used, such as an electron beam and that electron beam modulators can be used. The term "photoresist" will be understood to include conventional photoresists which are light sensitive, but also other materials which are radiation sensitive and can be used, for example, in electron beam recording systems.

The invention has been described in detail with particular reference to certain preferred embodiments thereof, but it will be understood that variations and modifications can be effected within the spirit and scope of the invention.

PARTS LIST 1 laser
1m modified laser
2 laser beam
3 mirror
4 intensity-modulated laser beam
5 frequency- and intensity-modulated laser beam
6 point of incidence of laser beam (5)
7 low-intensity control
9 lead
10 photoresist master disc
12 substrate
14 inner peripheral edge
16 central hole
18 outer peripheral edge
20 photoresist layer
22 upper surface of photoresist layer
30 ROM area
32 frequency-modulated groove or wobbled groove
33 center line of a wobbled groove
34 track(s) of depressions along a frequency-modulated groove
35 center line of track(s) of depressions
50 recordable area
52 frequency-modulated groove or wobbled groove
60 motor
62 disc-drive spindle
63 direction of disc rotation
64 motor rotational speed control
66 lead
70 radial position control
72 radial position linkage
100 laser beam modulation control system
102 laser beam modulation control system
104 laser beam modulation control system
110 central clock
111 lead
112 lead
114 lead
120 ATIP generator
124 lead
126 lead
128 ATIP driver
130 EFM generator
131 input lead
132 lead
136 lead
138 EFM driver
140 logic circuit
142 lead
146 lead
150 logic circuit
152 lead
156 lead
160 optical modulator (laser beam intensity modulation)
180 optical modulator (laser beam wobble-frequency modulation)
190 microprocessor controller
192 lead
194 lead
196 lead
198 lead
210 function generator
212 lead
220 multiplexer ("MUX")
226 lead
230 waveform modifier
232 lead
300 dual-beam laser recording system
302 dual-beam laser recording system
310 laser
311 first laser beam
312 laser
313 second laser beam
314 beam splitter
315 split first laser beam
316 mirror
317 split second laser beam
322 optical modulator (laser beam intensity modulation)
325 intensity-modulated laser beam
326 optical modulator (laser beam frequency modulation)
327 frequency-modulated laser beam
330 intensity control
332 lead
334 beam combiner
335 intensity-modulated combined laser beam
336 mirror 337 frequency-modulated combined laser beam
345 point of incidence of laser beam (335)
347 point of incidence of laser beam (337)
360 EFM driver
362 lead
370 ATIP driver
372 lead
ØR diameter of a reading laser light beam
D exposed depression(s)
G wobbled groove
D+G depression(s) along a wobbled groove
s spacing between two laser beams at points of incidence
SYNC synchronization
t thickness of photoresist layer (20)
TTL transistor-to-transistor logic
W1 width dimension of an (narrower) exposed wobbled groove
W2 width dimension of an (wider) exposed wobbled groove

What is claimed is:

1. A radiation beam recording system for exposing a photoresist master disc having a photoresist layer formed over a substrate for making a hybrid optical recording disc having a read only (ROM) portion and a writable portion, comprising:
  a) means for modulating an intensity of a laser beam having a wavelength selected to provide activating radiation to expose a pattern in the photoresist layer formed over the substrate of the master disc between a lower intensity for exposing a groove in the photoresist layer and a higher intensity for exposing the groove and a pattern of depressions in the groove in the photoresist layer;
  b) means for frequency-modulating the intensity-modulated beam with a wobble-frequency to cause the exposed groove to be a continuously frequency-modulated wobbled groove;
  c) a modulation control system for controlling the intensity modulation and the frequency modulation of the beam to form a continuously frequency-modulated exposed groove with exposed depressions in the ROM portion of the exposed groove, said continuously frequency-modulated exposed groove having one segment for storing and erasing data and another segment for storing read only data;
  d) means for rotating the photoresist master disc during exposure to the laser beam, and means for radially translating the master disc so that the laser beam incident on the photoresist layer will trace a continuous exposed spiral groove; and
  e) wherein said modulation control system includes a clock, an ATIP generator connected to the clock and operative to generate a frequency-modulating ATIP signal, an EFM generator connected to the clock and operative to generate an intensity-modulating EFM signal in correspondence with digital data input signals, and means for controlling temporal relationships between and among the ATIP generator and the EFM generator so that respective ATIP signals and EFM signals are temporally correlated to provide concurrent operation of the intensity- and frequency modulation of the laser beam, the means for controlling temporal relationships include a first logic circuit means for creating flag pulses directed from the EFM generator to the ATIP generator, or vice versa, and a second logic circuit means for creating flag pulses directed from the ATIP generator to the EFM generator, or vice versa.

2. The laser beam recording system of claim 1 wherein the first and the second logic circuits include TTL logic circuits.

3. A laser beam recording system for making a hybrid optical master disc from which a stamper can be derived for forming a hybrid optical recording disc, the system comprising:
  a) a laser which emits a laser beam having a wavelength selected to provide activating radiation to a photoresist layer formed over a substrate of the master disc;
  b) a first optical modulator for modulating an intensity of the laser beam between a lower intensity for exposing a groove in the photoresist layer and a higher intensity for exposing a groove and a pattern of depressions in the groove in the photoresist layer, the pattern of depressions coincident with the groove, and the pattern of depressions exposed in response to an intensity-modulating signal;
  c) a second optical modulator for frequency-modulating the intensity-modulated laser beam with a wobble-frequency in response to a frequency-modulating signal, the first and the second optical modulators operative concurrently to expose a continuous frequency-modulated groove having portions corresponding to a ROM region of a hybrid optical recording disc in which the intensity-modulated pattern of depressions is exposed;
  d) means for rotating the photoresist master disc during exposure to the laser beam, and means for radially translating the master disc so that the laser beam incident on the photoresist layer will trace a continuous exposed spiral groove; and
  e) a laser beam modulation control system including
    (i) a clock;
    (ii) an ATIP generator connected to the clock and operative to generate a frequency-modulating ATIP signal and means for generating ATIP flag pulses;
    (iii) an EFM generator connected to the clock and operative to generate an intensity-modulating EFM signal in correspondence with digital data input signals and means for generating EFM flag pulses;
    (iv) logic circuits for providing logic control of temporal relationships between an intensity-modulating output signal of the EFM generator and a wobble-frequency-modulating output signal of the ATIP generator, the logic circuits receiving flag pulses from the EFM generator and directing such EFM flag pulses to the ATIP generator, and the logic circuits receiving flag pulses from the ATIP generator and directing such ATIP flag pulses to the EFM generator;
    (v) a function generator for generating a time-varying signal at an output thereof in response to input pulse signals received from a first output of the logic circuits;
    (vi) a waveform modifier receiving the intensity-modulating EFM signal from the EFM generator and providing a selectable bias level signal such that an output signal of the waveform generator will have a selected bias level signal and the EFM signal superimposed thereupon, whereby the selected bias level signal provides the lower intensity of the laser beam for exposing the groove in the photoresist layer, and the EFM signal superimposed upon the selected bias provides the higher intensity of the laser beam for exposing the groove and the pattern of the depressions in the groove in the photoresist layer; and (vii) a multiplexer operative to provide an intensity-modulating output signal to the first optical modulator in response to a multiplexer input control signal provided by a second output of the logic circuits, the intensity-modulating output signal of the multiplexer either being the EFM signal superimposed upon the bias level signal provided by the waveform modifier or being the time-varying signal provided by the function generator in correspondence with the presence or absence of the multiplexer input control signal.

4. The laser beam recording system of claim 3 wherein the multiplexer provides the intensity-modulating output signal to an EFM driver which, in turn, actuates the first optical modulator for intensity-modulating the laser beam.

5. The laser beam recording system of claim 3 wherein the ATIP generator provides the frequency-modulating ATIP signal to an ATIP driver which, in turn, actuates the second optical modulator for frequency-modulating the laser beam with a wobble-frequency.

6. The laser beam recording system of claim 3 wherein the ATIP generator and the EFM generator further provide synchronization (SYNC) pulses which periodically synchronize a temporal relationship between the intensity modulation and the frequency modulation along the exposed spiral groove.

7. The laser beam recording system of claim 3 wherein the laser beam has a wavelength in a range from 350 to 450 nm, the photoresist layer is formed of a positive-working photoresist material, and the photoresist layer has a thickness in a range from 290–350 nm.

8. The laser beam recording system of claim 3 wherein the time-varying signal generated by the function generator is a ramp signal.

9. The laser beam recording system of claim 8 wherein the ramp signal increases linearly with time.

10. The laser beam recording system of claim 8 wherein the ramp signal increases non-linearly with time.

* * * * *